US008309274B2

(12) United States Patent
Rock et al.

(10) Patent No.: US 8,309,274 B2
(45) Date of Patent: Nov. 13, 2012

(54) SEPARATOR PLATES FORMED BY PHOTOPOLYMER BASED PROCESSES

(75) Inventors: Jeffrey A. Rock, Fairport, NY (US);
Yeh-Hung Lai, Webster, NY (US);
Keith E. Newman, Athens, PA (US);
Gerald W. Fly, Geneseo, NY (US);
Alan J. Jacobsen, Pacific Palisades, CA (US); Peter D. Brewer, Westlake Village, CA (US); William B. Carter, Santa Monica, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 459 days.

(21) Appl. No.: 12/466,405

(22) Filed: May 15, 2009

(65) Prior Publication Data

US 2010/0291465 A1 Nov. 18, 2010

(51) Int. Cl.
*H01M 4/64* (2006.01)
*H01M 8/00* (2006.01)
*B29C 35/04* (2006.01)
*B29C 59/16* (2006.01)

(52) U.S. Cl. ........ 429/518; 429/535; 264/401; 264/425; 264/447; 264/494

(58) Field of Classification Search .................. 429/518, 429/535; 264/401, 447, 425, 494
See application file for complete search history.

(56) References Cited

U.S. PATENT DOCUMENTS

| 5,980,813 | A | * | 11/1999 | Narang et al. | 264/401 |
|---|---|---|---|---|---|
| 6,274,288 | B1 | | 8/2001 | Kewitsch et al. | |
| 7,205,252 | B2 | * | 4/2007 | Becker et al. | 501/4 |
| 7,382,959 | B1 | | 6/2008 | Jacobsen | |
| 2005/0163988 | A1 | * | 7/2005 | Ebert et al. | 428/292.1 |
| 2005/0221150 | A1 | * | 10/2005 | Revol | 429/38 |
| 2007/0238006 | A1 | * | 10/2007 | Vyas et al. | 429/38 |
| 2007/0243315 | A1 | * | 10/2007 | Buckley | 427/58 |
| 2007/0298309 | A1 | * | 12/2007 | Vyas et al. | 429/38 |

FOREIGN PATENT DOCUMENTS

CN 101043078 A 9/2007

OTHER PUBLICATIONS

Microstereolithography: Concepts and applications; Arnaud Bertsch, Paul Bernhard, Philippe Renaud; (c) 2001 IEEE.

(Continued)

*Primary Examiner* — Yogendra Gupta
*Assistant Examiner* — Jeremiah Smith
(74) *Attorney, Agent, or Firm* — Fraser Clemens Martin & Miller LLC; J. Douglas Miller

(57) ABSTRACT

A separator plate for a fuel cell is provided, including a substrate having a radiation-cured first flow field layer disposed thereon. A method for fabricating the separator plate is also provided. The method includes the steps of providing a substrate; applying a first radiation-sensitive material to the substrate; placing a first mask between a first radiation source and the first radiation-sensitive material, the first mask having a plurality of substantially radiation-transparent apertures; and exposing the first radiation-sensitive material to a plurality of first radiation beams to form a radiation-cured first flow field layer adjacent the substrate. A fuel cell having the separator plate is also provided.

6 Claims, 3 Drawing Sheets

OTHER PUBLICATIONS

Microstereolithography: a Review; Arnard Bertsch, Sebastien Jiguet, Paul Bernhard, Philippe Renaud; Swiss Federal Institute of Technology,(c) 2003 Material Research Society.

Characterisation of Epoxy Resins for Microstereolithographic Rapid Prototyping; C.R. Chatwin, M. Farsari, S. Huang, M.I. Heywood, R.C.D. Young, P.M. Birch, F. Claret-Tournier and J.D. Richardson, School of Engineering, University of Sussex, Falmer, Brighton, UK; (c) 1999 Springer-Verlag London Limited.

Two-Photon Photopolymerization and 3D Lithographic Microfabrication; Hong-Bo Sun, Satoshi Kawata; Depart of Applied Physics, Osaka University, Japan; APS (2004) (c) Springer-Verlag 2004.

Fabrication and moulding of cellular materials by rapid prototyping; J. Stampfl, H. Houad and S. Seidler; Institute of Material Science and Testing, Vienna University of Technology, Austria; R Liska and F. Schwager; Institute of Applied Synthetic Chemistry, Vienna University of Technology, Austria; A Woesz and P Fratzl; Max Planck Institute of Colloids and Interfaces, Germany; Int. J. Materials and Product Technology, vol. 21, No. 4, 2004, (c) Inderscience Enterprises Ltd.

Acta Materialia 55 (2007) 6724-6733, Compression behavior of micro-scale truss structures formed from self-propagating polymer waveguides; Alan J. Jacobsen, William Barvosa-Carter, Steven Nutt. Published by Elsevier Ltd.

* cited by examiner

SEPARATOR PLATES FORMED BY PHOTOPOLYMER BASED PROCESSES

FIELD OF THE INVENTION

The present disclosure relates to a fuel cell and more particularly to fuel cell separator plates manufactured by photopolymerization.

BACKGROUND OF THE INVENTION

A fuel cell has been proposed as a clean, efficient and environmentally responsible power source for electric vehicles and various other applications. Individual fuel cells can be stacked together in series to form a fuel cell stack for various applications. The fuel cell stack is capable of supplying a quantity of electricity sufficient to power a vehicle. In particular, the fuel cell stack has been identified as a potential alternative for the traditional internal-combustion engine used in modern automobiles.

One type of fuel cell is the polymer electrolyte membrane (PEM) fuel cell. The PEM fuel cell includes three basic components: an electrolyte membrane; and a pair of electrodes, including a cathode and an anode. The electrolyte membrane is sandwiched between the electrodes to form a membrane-electrode-assembly (MEA). The MEA is typically disposed between porous diffusion media (DM), such as carbon fiber paper, which facilitates a delivery of reactants, such as hydrogen to the anode and oxygen to the cathode. In the electrochemical fuel cell reaction, the hydrogen is catalytically oxidized in the anode to generate free protons and electrons. The protons pass through the electrolyte to the cathode. The electrons from the anode cannot pass through the electrolyte membrane, and are instead directed as an electric current to the cathode through an electrical load, such as an electric motor. The protons react with the oxygen and the electrons in the cathode to generate water.

It is also known to use other reactants in the PEM fuel cell such as methanol, for example. Methanol may be catalytically oxidized to form carbon dioxide. Protons from the methanol oxidation are transported across the electrolyte membrane to the cathode where they react with oxygen, typically from air, to generate water. As with the hydrogen PEM fuel cell, electrons are transported as an electric current through the external load, such as the electric motor, from the anode to the cathode.

The electrolyte membrane is typically formed from a layer of ionomer. A typical ionomer is a perfluorosulfonic acid (PFSA) polymer, such as Nafion®, commercially available from the E.I. du Pont de Nemours and Company. The electrodes of the fuel cell are generally formed from a finely divided catalyst. The catalyst may be any electro-catalyst which catalytically supports at least one of an oxidation of hydrogen or methanol and a reduction of oxygen for the fuel cell electrochemical reaction. The catalyst is typically a precious metal such as platinum or another platinum-group metal. The catalyst is generally disposed on a carbon support, such as carbon black particles, and is dispersed in an ionomer.

The electrolyte membrane, electrodes, and DM are disposed between a pair of fuel cell separator plates and sealed, for example, with a gasket providing a substantially fluid-tight seal. Each of the separator plates may have a plurality of channels formed therein for distribution of the reactants and coolant to the fuel cell. The separator plate is typically formed by a conventional process for shaping sheet metal such as stamping, machining, molding, or photo etching through a photolithographic mask, for example. In the case of a bipolar separator plate, the bipolar separator plate is typically formed from a pair of unipolar plates which are then joined. It is also known to form the separator plate from a composite material, such as a graphite composite or graphite-filled polymer. Undesirably, the known methods for forming the separator plates can be costly and time consuming.

It is also known to manufacture separator plates for fuel cells according to conventional foaming processes, such as with reticulated metal foam materials. However, conventional foaming processes yield non-uniform and random (not ordered) three dimensional microstructures. Certain techniques do exist to create ordered three dimensional microstructures, such as stereolithography techniques; however, these techniques typically rely on a bottom-up, layer-by-layer approach which prohibits production volume scalability.

Radiation-cured structures are described by Jacobsen et al. in "Compression behavior of micro-scale truss structures formed from self-propagating polymer waveguides", Acta Materialia 55, (2007) 6724-6733, the entire disclosure of which is hereby incorporated herein by reference. One method and system of creating radiation-cured structures is disclosed by Jacobsen in U.S. Pat. No. 7,382,959, the entire disclosure of which is hereby incorporated herein by reference. The system includes at least one collimated light source selected to produce a collimated light beam; a reservoir having a photo-monomer adapted to polymerize by the collimated light beam; and a mask having at least one aperture and positioned between the at least one collimated light source and the reservoir. The at least one aperture is adapted to guide a portion of the collimated light beam into the photo-monomer to form the at least one polymer waveguide through a portion of a volume of the photo-monomer. Further radiation-cured structures are disclosed by Jacobsen in U.S. patent application Ser. No. 11/801,908, the entire disclosure of which is hereby incorporated herein by reference. A polymer material that is exposed to radiation and results in a self-focusing or self-trapping of light by formation of polymer waveguides is also described by Kewitsch et al. in U.S. Pat. No. 6,274,288, the entire disclosure of which is hereby incorporated herein by reference.

There is a continuing need for a structure and method of manufacturing separator plates for a fuel cell that optimizes fuel cell durability, minimizes tooling costs, minimizes production costs, and minimizes development time.

SUMMARY OF THE INVENTION

In concordance with the instant disclosure, a structure and method for manufacturing separator plates that optimizes fuel cell durability, minimizes tooling costs, minimizes production costs, and minimizes development time, is surprisingly discovered.

In a first embodiment, a separator plate for a fuel cell includes an electrically conductive substrate having a radiation-cured first flow field layer disposed adjacent thereto.

In another embodiment, a fuel cell includes a membrane electrode assembly having an electrolyte membrane disposed between a pair of electrodes. A pair of diffusion medium layers having the membrane electrode assembly is interposed therebetween. The fuel cell further includes a pair of separator plates having the membrane electrode assembly and the diffusion medium layers disposed therebetween. At least one of the separator plates has a substrate with a radiation-cured flowfield layer disposed adjacent thereto.

In a further embodiment, a method for fabricating a separator plate for a fuel cell includes the steps of: providing a substrate; applying a first radiation-sensitive material to the substrate; placing a first mask between a first radiation source and the first radiation-sensitive material, the first mask having a plurality of substantially radiation-transparent apertures; and exposing the first radiation-sensitive material to a plurality of first radiation beams to form a radiation-cured first flow field layer adjacent the substrate.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, are not necessary or critical.

Figure 1:
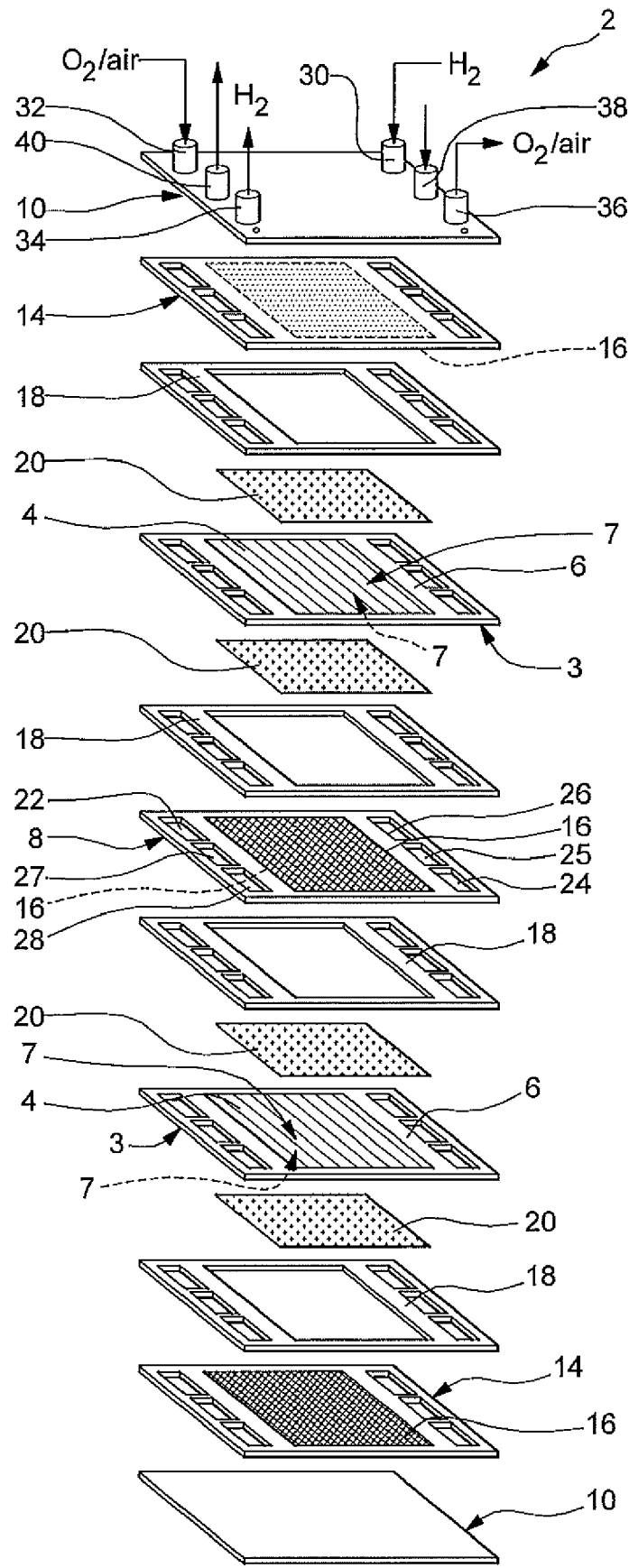
FIG. 1 is an exploded, schematic perspective view of a fuel cell according to the present disclosure.

FIG. 1 depicts a PEM fuel cell stack 2 according to the present disclosure. For simplicity, only a two-cell stack (i.e. one bipolar plate) is illustrated and described in FIG. 1, it being understood that a typical fuel cell stack 2 will have many more such cells and bipolar plates. The fuel cell stack 2 includes at least one membrane electrode assembly (MEA) 3. The MEA 3 may be formed from an electrolyte membrane 4 supported by a subgasket 6. The electrolyte membrane 4 is sandwiched between a pair of electrodes 7. Although the MEAs 3 having a catalyst coated membrane (CCM) design are shown for purpose of simplicity, it should be understood that the fuel cell stack 2 may employ a catalyst coated diffusion media (CCDM) design, if desired.

An electrically conductive separator plate 8 is disposed between the MEAs 3. The electrolyte membranes 4, the electrodes 7, and the separator plate 8 may be stacked together between a pair of clamping plates 10, and a pair of unipolar end plates 14. The clamping plates 10 are electrically insulated from the unipolar end plates 14, for example, by a gasket (not shown) or a dielectric coating (not shown). The unipolar end plates 14 and the separator plate 8 include flow fields 16 for distributing reactants, such as hydrogen gas and oxygen/air, to the electrodes 7. The flow fields 16 of the separator plate 8 and the unipolar end plates 14 may further include a plurality of flow channels 206, 208 (shown in FIG. 2) configured to distribute the reactants to the electrodes 7.

The fuel cell stack 2 may include nonconductive gaskets 18 to provide seals and electrical insulation between the components of the fuel cell stack 2. If the subgaskets 6 sufficiently seal and electrically insulate the fuel cell stack 2, however, it should be appreciated that the gaskets 18 may be eliminated, as desired. Porous diffusion medium layers 20 abut the electrodes 7 disposed adjacent the electrolyte membrane 4, and are configured to distribute the fuel cell reactants thereto. The diffusion medium layers 20 are disposed between the electrodes 7 and the separator plate 8, and between the electrolyte membrane 4 and the unipolar end plate 14. A skilled artisan should appreciate that the diffusion medium layers 20 may also have microporous layers (not shown) disposed between the diffusion medium layers 20 and the electrodes 7, as desired.

The MEAs 3, separator plate 8, unipolar end plates 14, and the gaskets 18 each include a cathode supply aperture 22 and a cathode exhaust aperture 24, a coolant supply aperture 25 and a coolant exhaust aperture 27, and an anode supply aperture 26 and an anode exhaust aperture 28. Supply manifolds and exhaust manifolds of the fuel cell stack 2 are formed by an alignment of the respective apertures 22, 24, 25, 26, 27, 28 in the subgaskets 6, separator plate 8, unipolar end plates 14, and the gaskets 18. Hydrogen gas is supplied to an anode supply manifold via an anode inlet conduit 30. The oxygen/air is supplied to a cathode supply manifold of the fuel cell stack 2 via a cathode inlet conduit 32. An anode outlet conduit 34 and a cathode outlet conduit 36 are also provided for an anode exhaust manifold and a cathode exhaust manifold, respectively. A coolant inlet conduit 38 is provided for supplying liquid coolant to a coolant supply manifold. A coolant outlet conduit 40 is provided for removing coolant from a coolant exhaust manifold. It should be understood that the configurations of the various inlets 30, 32, 38 and outlets 34, 36, 40 in FIG. 1 are for the purpose of illustration, and other configurations may be chosen as desired.

Figure 2:
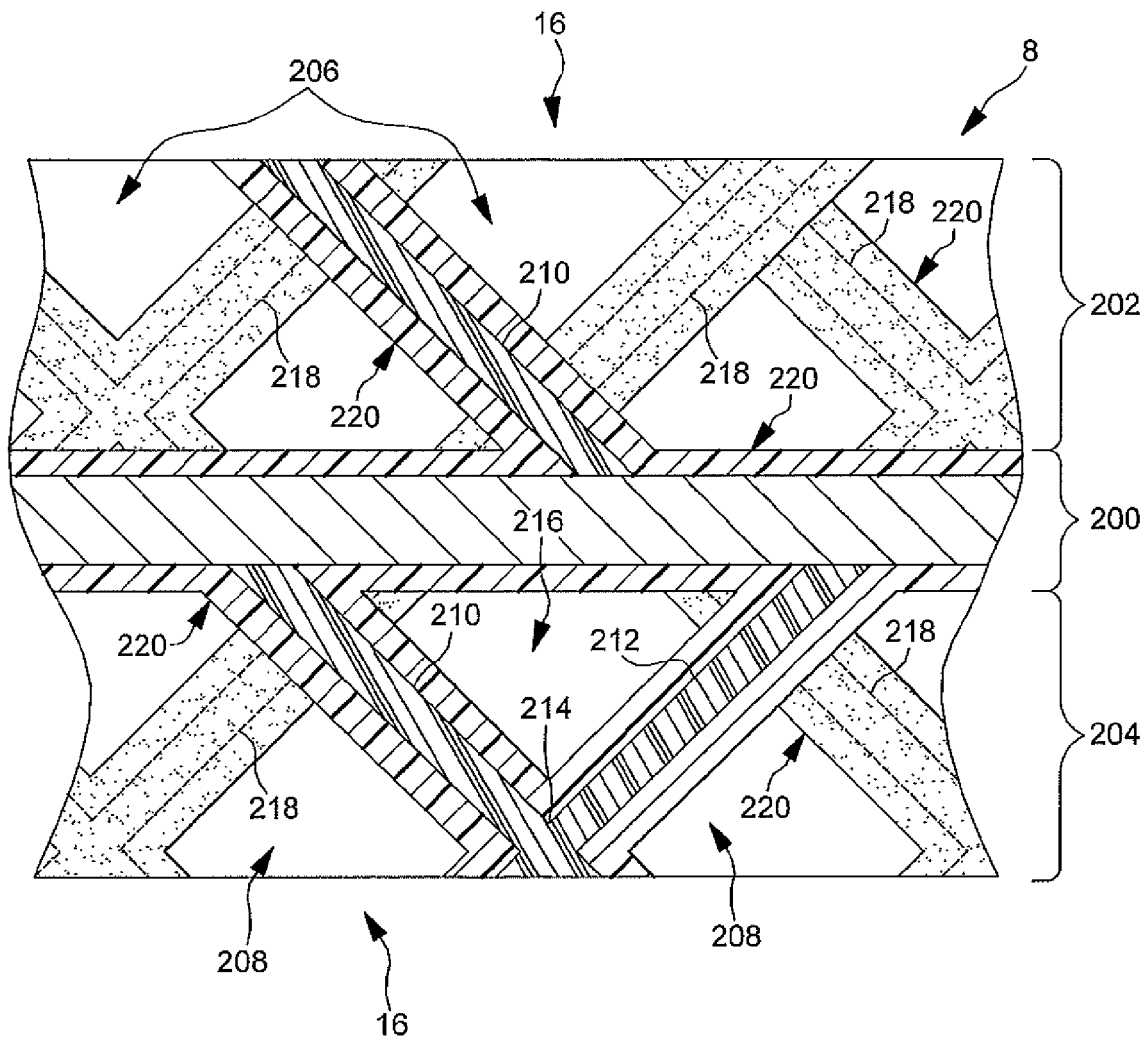
FIG. 2 is a schematic, fragmentary side cross-sectional elevational view of a separator plate according to an embodiment of the present disclosure.

As shown in FIG. 2, the separator plate 8 of the present disclosure is fabricated at least in part from a radiation-sensitive material by a process such as photopolymerization, for example. The formation of radiation-cured structures such as the separator plate 8 from the radiation sensitive material is described, for example, in Assignee's co-pending U.S. patent application Ser. No. 12/339,308, the entire disclosure of which is hereby incorporated herein by reference.

The separator plate 8 includes a substrate 200 having a radiation-cured first flow field layer 202 disposed adjacent thereto. The substrate 200 may also have a radiation-cured second flow field layer 204 disposed adjacent thereto. The substrate 200 may be disposed between the first flow field layer 202 and the second flow field layer 204 to provide the separator plate 8 with a bipolar configuration. It should be understood that unipolar separator plates 8 having the substrate 200 with only the radiation-cured first flow field layer 202 disposed adjacent thereto are also within the scope of the present disclosure.

The substrate 200 may be formed from any material that permits the formation of polymeric structures thereon. The substrate 200 may be electrically conductive or electrically nonconductive, as desired. In one example, the substrate 200 is formed from a metal or an electrically conductive composite material that does not significantly degrade under typical photopolymerization conditions. In a particular example, the substrate 200 is formed from a stainless steel sheet. The stainless steel sheet may be provided as one of a coiled steel strip, a rack loaded steel strip, or an individual blank, for example. In certain embodiments the substrate 200 is substantially planar.

The substrate 200 may alternatively be formed from an electrically nonconductive material having holes or vias formed therein in which an electrically conductive material may be disposed. The electrically conductive vias may be provided by an electrically conductive coating (shown in FIG. 2) deposited on the substrate 200, for example.

The substrate 200 may further be provided with a coating (not shown) or surface treatment for bonding to the first and second flow field layers 202, 204. As a nonlimiting example, the substrate 200 may have a coating adapted to bond with an uncured polymer material during the manufacture of the separator plate 8. The substrate 200 may also be provided with a texture or a pattern formed therein, as desired. The surfaces of the substrate 200 may be textured, e.g., by embossing, sandblasting, and the like, to increase an available surface area for bonding between the substrate 200 and the first and second flow field layers 202, 204. A skilled artisan may select suitable surface treatments, including coatings, as desired.

In particular embodiments, the substrate 200 may have through holes (not shown) formed therein. The through holes may facilitate a draining of residual liquid radiation-sensitive materials and solvents, or a removal of residual solid radiation-sensitive materials, employed during manufacture of the separator plate 8. The through holes may also provide typical end product features such as ports and the header apertures 22, 24, 25, 26, 27, 28, for example, as described in Applicant's copending U.S. patent application Ser. No. 11/762,845, the entire disclosure of which is hereby incorporated herein by reference. The through holes may be formed by mechanical perforation or by laser cutting, for example, prior to application of the first and second flow field layers 202, 204 to the substrate 200. Other suitable means for forming the through holes may also be employed.

The first flow field layer 202 has a plurality of radiation-cured first reactant flow channels 206. The second flow field layer 204 has a plurality of radiation-cured second reactant flow channels 208. The first and second reactant flow channels 206, 208 may be defined by a plurality of first channel walls 210 extending along a first direction. The first and second reactant flow channels 206, 208 may also be defined by a plurality of second channel walls 212 extending along a second direction. Each of the first and second channel walls 210, 212 may further extend along a length of the separator plate 8, for example, to facilitate the transportation of the reactant fluids across the flow fields 16 of the separator plate 8. A skilled artisan should appreciate that the first and second channel walls 210, 212 may extend along the length of the separator plate 8 in at least one of a linear, serpentine, or another suitable manner, as desired. The first and second channel walls 210, 212 may interpenetrate each other at a plurality of junctions 214. The junctions 214 may be disposed adjacent one of the substrate 200 and an opposite surface of one of the first and second flow field layers 202, 204, as desired.

Illustratively, the first and second channel walls 210, 212 may cooperate with the substrate 200 to form a plurality of coolant channels 216. The coolant channels 216 facilitate a temperature control of the fuel cell stack 2 during an operation thereof. Like the first and second reactant flow channels 206, 208, the coolant channels 216 may extend along a length of the separator plate 8. As a nonlimiting example, the first and second channel walls 210, 212 may form substantially V-shaped coolant channels 216. In certain embodiments, the first and second reactant flow channels 206, 208 are formed from the first and second channel walls 210, 212. It should be appreciated that forming the first and second reactant flow channels 206, 208 and coolant channels 216 as open V-shapes may allow recovery of residual radiation-sensitive materials used employed during the fabrication of the separator plate 8.

At least one of the first and second flow field layers 202, 204 may include a plurality of spaced apart support ligaments 218. The support ligaments 218 are disposed between at least one of the first and second channel walls 210, 212 and the substrate 200. The support ligaments 218 may be spaced apart along the length of the first and second channel walls 210, 212, for example. The support ligaments 218 militate against a flexing of at least one of the first and second channel walls 210, 212 when the fuel cell stack 2 is compressed during assembly thereof. In particular, the spaced apart support ligaments 218 may facilitate a flow of reactants though the flow field 16 and militate against an undesirable flexing of the first and second channel walls 210, 212 under typical fuel cell operating conditions. The support ligaments 218 may further be adapted to carry current within the fuel cell stack 2.

In a one embodiment, the support ligaments 218 may be provided by a microtruss structure disposed between at least one of the first and second channel walls 210, 212 and the substrate 200. The microtruss structure may include a plurality of first truss elements that extend along a first direction, a plurality of second truss elements that extend along a second direction, a plurality of third truss elements that extend along a third direction, and a plurality of fourth truss elements that extend along a fourth direction. The first, second, third, and fourth truss elements may interpenetrate each other at a plurality of nodes. It should be appreciated that the first, second, third, and fourth truss elements may not interpenetrate each other, or may interpenetrate each other at the plurality of nodes on an intermittent basis, as desired. The first, second, third, and fourth truss elements form a substantially continuous, three dimensional self supporting cellular structure that allows the flow of fuel cell reactants therethrough.

Although the microtruss structure with the plurality of first truss elements, the plurality of second truss elements, the plurality of third truss elements, and the plurality of fourth truss elements may have a 4-fold architectural symmetry as described hereinabove, a skilled artisan should appreciate that other architectures, such as a 3-fold symmetry and 6-fold symmetry, may be employed within the scope of the present disclosure. The particular architecture may be selected, for example, to increase the microtruss structure connectivity and reduce susceptibility to bending and buckling of the microtruss structure under a load. The selected architecture may be symmetrical or asymmetrical, as desired. The architecture may also be selected to optimize a strength and a stiffness of the microtruss structure. One of ordinary skill in the art should further understand that other architectures for the microtruss structure may be employed, as desired.

Exemplary architectures of the microtruss structure are described by Jacobsen in U.S. Pat. No. 7,382,959 and U.S. patent application Ser. No. 11/801,908. For example, the plurality of first truss elements may be defined by a plurality of first self-propagating polymer truss waveguides. The plurality of second truss elements may be defined by a plurality of second self-propagating polymer truss waveguides. The plurality of third truss elements may be defined by a plurality of third self-propagating polymer truss waveguides. The plurality of fourth truss elements may be defined by a plurality of fourth self-propagating polymer truss waveguides. The first, second, third, and fourth waveguides may be formed from a liquid photomonomer that exhibits a shift in index of refraction upon photopolymerization, for example. Alternatively, it should be appreciated that the microtruss structure may be formed from a material that does not form via a shift in index of refraction to form a polymer waveguide, such as by controlled radiation exposure of a substantially solid radiation-sensitive material as described herein. Other suitable means of forming the microtruss structure may be employed as desired.

One of ordinary skill in the art should appreciate that the particular microtruss structure can be designed as desired, for example, by at least one of: 1) selecting the angles and the patterns of the polymer truss elements with respect to one another, 2) adjusting the packing, or relative density of the resulting cellular structure, and 3) selecting the cross-sectional shapes and dimensions of the polymer truss elements. In particular, polymer truss elements having an elliptical cross-sectional shape may militate against degradation with differences in coefficient of thermal expansion of the fuel cell stack 2. Other cross-sectional shapes may also be employed, as desired.

The first and second flow field layers 202, 204 are formed at least in part from a radiation-sensitive material. The radiation-sensitive material employed to form at least one of the first and second flow field layers 202, 204 includes radiation-curable materials and radiation-dissociable materials. The term "radiation-curable material" is defined herein as any material that is at least one of initiated, polymerized, and crosslinked by exposure to radiation. It should be appreciated that an increase in temperature may also be employed to at least partially complete polymerization or crosslinking of the radiation-curable materials following an initiation by the exposure to radiation. The term "radiation-dissociable material" is defined herein as any material that exhibits at least one of a scissioning of the polymer backbone and a decrosslinking by exposure to radiation. As a nonlimiting example, the radiation-dissociable material may be made solvent-soluble by a sufficient breakage of crosslinks and/or scissioning of the polymer backbone of the radiation-dissociable material.

As nonlimiting examples, the radiation-curable materials may include one of a liquid photomonomer and a substantially solid radiation-curable polymer. The liquid photomonomer may be a monomer as described by Jacobsen in U.S. Pat. No. 7,382,959 and U.S. application Ser. No. 11/801,908. Nonlimiting examples of suitable photomonomers include monomers that polymerize via free-radical polymerization when exposed to radiation. The photomonomer may include any suitable free-radical photopolymer material such as urethanes (polyurethanes), acrylates, methacrylates, and cationic polymers such as photo-cured epoxies. Other suitable photomonomers may also be employed.

Suitable substantially solid radiation-curable polymers may include negative resist polymers. Negative resist polymers go through a photoinitiation process that leads to a curing of the negative resist polymer by polymerization or polycondensation, for example. Where the polymerization or polycondensation reaction occurs at substantially the same time, the process is referred to as "photocured". Where only the reaction species are generated by the photoinitiation process and a subsequent step such a heating is required to generate the polymerization or polycondensation, the process is be referred to as "photoinitiated". It should be appreciated that even though a post-cure heat treatment may be necessary to finalize the polymerization step, substantially stable radiation-cured features in the negative photoresist polymer may also be created during the initial radiation exposure. The substantially solid radiation-curable polymers can go through just the initiation process and, due to inherent stability and the limited diffusion rate of the chemical species within the solid radiation-curable polymers, the curing process may also be performed much later without significant feature degradation. It should be appreciated that most photoinitiated polymers begin the curing process at the inception of the initiation process, but the kinetics of the reaction at the exposure temperature are so slow that little, if any, polymerization or polycondensation may take place prior to heating the negative resist polymer to a desired curing temperature.

One particular negative resist polymer is the epoxy-based SU-8 2000™ negative resist polymer, commercially available from Microchem Corporation in Newton, Mass. The SU-8 2000™ negative resist polymer is curable by UV radiation. It should be appreciated that other substantially solid radiation-curable polymers may be employed. For example, similar to the photomonomers described above, the radiation-curable polymer selected may be cured with radiation of wavelengths other than UV radiation, as desired. The radiation-curable polymer may also be selected to have a slower cure rate than the liquid photomonomer, for example, to militate against features from appearing in the slower curing layer with exposure of the faster curing layer to a radiation source.

As a nonlimiting example, the radiation-dissociable materials may include positive resist polymers. Positive resist polymers begin as crosslinked polymers but may contain photoinitiators that, when exposed to a particular radiation, generate chemical species which dissociate the polymer by at least one of breaking the crosslinks and scissioning the polymer backbone. The dissociation makes the positive resist polymer soluble in the regions which have been exposed to the radiation. Regions where the positive resist polymer remains cured are masked rather than being exposed, as is the case with the negative resist polymers described hereinabove. In certain embodiments, the positive resist polymers are sensitive to radiation, e.g., ultraviolet or electron beam, without the need for photoinitiators. For example, the positive resist polymer may itself be damaged by the radiation and the remaining scissioned chains become soluble in a solvent. Other types of positive resist polymers may be employed, as desired.

The radiation employed to one of cure and dissociate the radiation-sensitive materials may include a UV beam from a Mercury arc lamp, for example. The radiation may be electromagnetic radiation or particle radiation, as desired. A skilled artisan understands that radiation of other wavelengths, such as infrared, visible light, and X-ray radiation, and from other sources, such as incandescent lights and lasers, may also be employed. Particle radiation such as an electron beam from a cathode ray source may also be employed. It should be further understood that the radiation may be collimated, partially collimated, or non-collimated, as desired.

The radiation is typically directed to the radiation-sensitive material via at least one mask having apertures or openings formed therein, through which the radiation may contact the radiation-sensitive material. The apertures may be substantially radiation-transparent apertures formed in an otherwise opaque or radiation-blocking coating, for example. The mask may be formed from one of crown glass, Pyrex glass, and a polyethylene terephthalate, such as a Mylar® film, for example, and facilitate the directing of radiation beams at an angle relative to either the mask or the underlying substrate 200. The mask may be lifted away after an exposure and cleaned for reuse. Multiple masks with different patterns and types of the plurality of apertures may also be employed. In certain embodiments, the mask is provided as an integral part of the radiation source. The apertures may have shapes that provide the radiation-cured elements with desired cross-sectional shapes. The apertures may be substantially circular to create elliptical cross-sectional shapes, for example. A skilled artisan may select suitable mask materials, aperture sizes and shapes, and resulting structural configurations, as desired.

In one illustrative embodiment, the mask surface has a plurality of holes with a diameter of about 10 microns. In another embodiment, the apertures are elongate slots that provide radiation sheets to form at least one of the first and second channel walls 210, 212 with substantially rectangular cross-sectional shapes. The radiation sheets may thereby be employed to form at least one of the reactant flow channels 206, 208 and the coolant channels 216 of the separator plate 8. The exposure to radiation may be conducted intermittently in a series of short exposures, for example, or in longer durations to provide the desired structural design. A skilled artisan may select suitable mask materials, aperture and opening sizes and shapes, and resulting structural configurations, as desired.

It should be understood that at least one of the first and second flow field layers 202, 204 may be formed from radiation-sensitive material that is electrically conductive when cured. In a particular embodiment, at least one of the first and second flow field layers 202, 204 has an electrically conductive coating 220. For example, at least one of the first and second flow field layers 202, 204 may be plated with a metal coating that is substantially oxidation resistant, reduction resistant, and acid-resistant. The metal coating may be formed in multiple plating steps. For example, the metal coating may be formed by the application of a first layer of an electroless nickel base followed by a second layer of NiCr or Cr plating for corrosion resistance and a third layer of an overcoating with Au or Pd for the minimization of contact resistance between the first and second flow field layers 202, 204 and the adjacent diffusion medium layers 20. The first layer and the second layer may be plated on, and the third layer applied by physical vapor deposition to limit coverage, for example. Other methods for depositing the electrically conductive coating 220 onto the at least one of the first and second flow field layer 202, 204, may be employed as desired.

In certain embodiments the electrically conductive coating 220 includes a noble metal selected from the group consisting of: ruthenium (Ru), rhodium (Rh), palladium (Pd), silver (Ag), iridium (Ir), platinum (Pt), and osmium (Os), and alloys thereof. In a particular embodiment, the electrically conductive coating 220 is gold (Au). In another particular embodiment, the electrically conductive coating 220 is tantalum (Ta). Another suitable metal coating may include nickel (Ni) alloys, such as alloys of nickel and chromium (Cr) or nickel and cobalt (Co). As should be recognized by one of ordinary skill in the art, the electrically conductive coating 220 may include mixtures or alloys of the above identified metals. Other electrically conductive metals and materials may also be employed, as desired.

The electrically conductive coating 220 may be deposited on at least one of the first and second flow field layer 202, 204 by one of electron beam evaporation, magnetron sputtering, physical vapor deposition, chemical vapor deposition, atomic layer deposition, electrolytic deposition, electroless deposition, flame spray deposition, brush plating, and other like processes for example. Solution based electroplating techniques that include immersing at least one of the first and second flow field layers 202, 204 in a plating bath may also be employed. Application of the electrically conductive coating 220 in the form of a slurry powder and subsequently firing the slurry powder to form the coating may also be used. A skilled artisan may select more than one deposition technique to take into account differences between line of sight and non-line of sight characteristics of the deposition techniques selected. In certain embodiments, the electrically conductive material may be substantially evenly deposited on both the interior and exterior surfaces of the first and second flow field layers 202, 204. Suitable thicknesses and means for depositing the electrically conductive coating 220 may be selected as desired.

It should also be appreciated that, in the embodiments where the microtruss structure is employed, that the electrically conductive coating 220 may be used to at least partially fill a portion of the microtruss structure. A stiffness and a strength of the resulting separator plate 8 may thereby be optimized.

In certain illustrative embodiments, at least one of the first and second flow field layers 202, 204 may be converted to a metal oxide or ceramic to provide a desirable level of bending strength. For example, ceramic microstructures and methods for preparing ceramic microstructures are disclosed by Gross et al. in U.S. patent application Ser. No. 12/074,727, the entire disclosure of which is hereby incorporated herein by reference.

Figure 3:
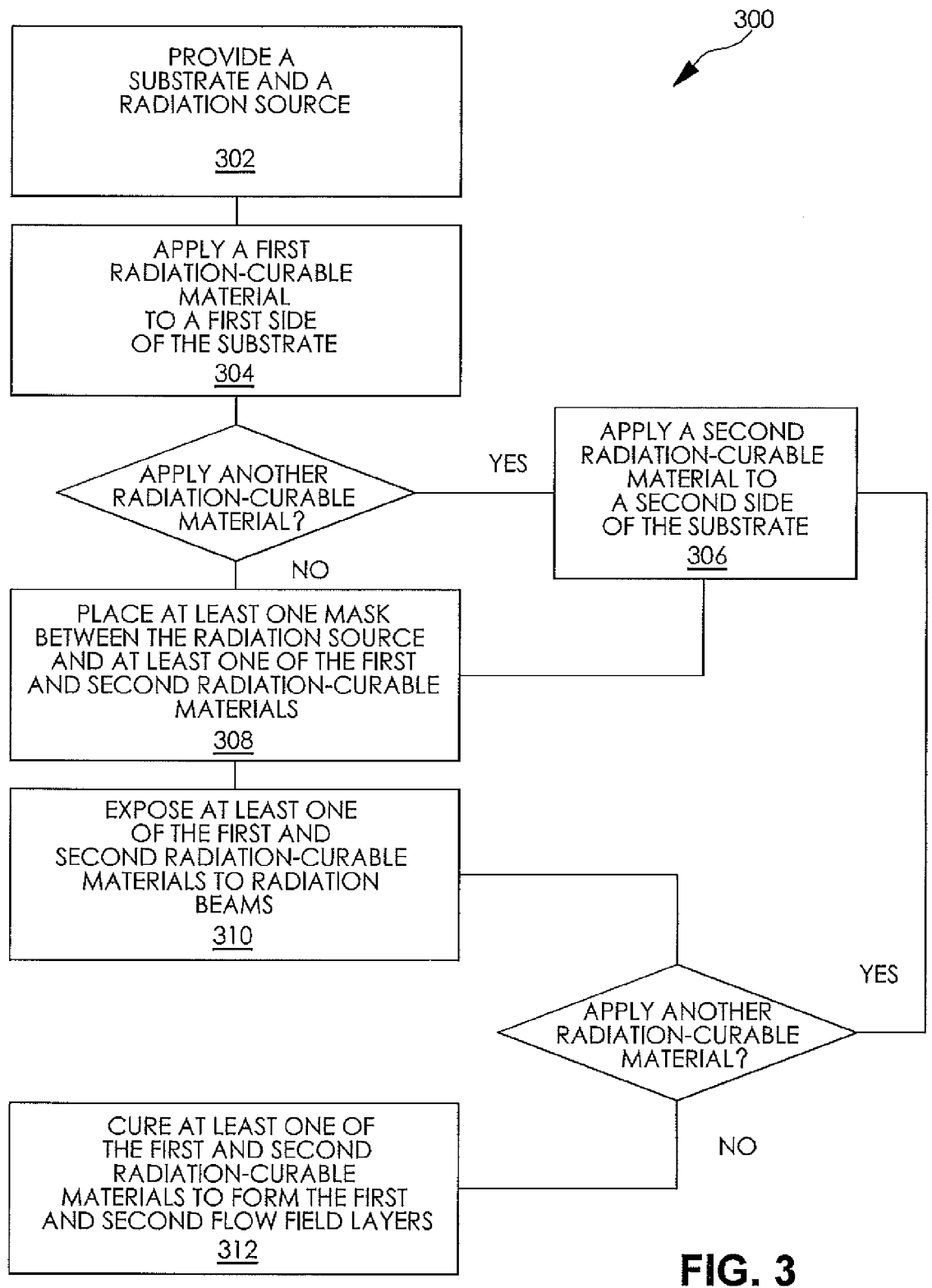
FIG. 3 is a process flow diagram illustrating the method for manufacturing the separator plate shown in FIGS. 2 and 3.

Referring now to FIG. 3, the present disclosure includes a method 300 for fabricating the separator plate 8. The method 300 first includes the steps of providing 302 the substrate 200; applying 304 a first radiation-sensitive material to the substrate; placing 308 a first mask between a first radiation source and the first radiation-sensitive materials; exposing 310 the first radiation-sensitive material to a plurality of first radiation beams from the first radiation source; and curing 312 the first radiation-sensitive material to form the radiation-cured first flow field layer 202 adjacent the substrate 200.

Where fabrication of the separator plate 8 having the bipolar configuration is desired, the method 300 further includes the steps of applying 306 a second radiation-sensitive material to the substrate 200 opposite the first radiation-sensitive material; placing 308 a second mask between a second radiation source and the second radiation-sensitive material; exposing 310 the second radiation-sensitive material to a plurality of second radiation beams; and curing 312 the second radiation-sensitive material to form the radiation-cured second flow field layer 204 adjacent the substrate 200.

The plurality of first and second radiation beams generated by the first and second radiation sources, respectively, may include at least one of a plurality of first radiation sheets extending along a first direction and a plurality of second radiation sheets extending along a second direction. At least one of the first radiation sheets and the second radiation sheets may be in the form of a substantially continuous layer of radiation extending along a desired plane. It should be appreciated that the first radiation sheets form the plurality of first radiation-cured channel walls 210 and the second radiation sheets form the plurality of second radiation-cured channel walls 212.

In another embodiment, at least one of the first flow field layer 202 and the second flow field layer 204 may be coated with the electrically conductive coating 220. In certain embodiments, the method 300 may include a step of removing an uncured volume of at least one of the first and second radiation-sensitive materials following the step of exposing the first and second radiation-sensitive materials to the plurality of first and second radiation beams. It should be appreciated that the term "uncured radiation-sensitive material" may also include dissociated radiation-sensitive material within the scope of the present disclosure. The uncured volume of at least one of the first and second radiation-sensitive materials may be removed prior to coating at least one of the first and second flow field layers 202, 204 with the electrically conductive coating 220, for example. As a nonlimiting example, the step of removing the uncured volume of the first and second radiation-sensitive materials may include rinsing at least one of the first and second flow field layers 202, 204 with a solvent. One of ordinary skill in the art should appreciate that suitable solvents do not substantially degrade the exposed radiation-cured first and second flow field layers 202, 204 during the step of removing the uncured volume of the first and second radiation-sensitive materials.

In a further embodiment at least one of the first and second radiation-sensitive materials may be heated following the step of exposing the first and second radiation-sensitive materials to the plurality of first and second radiation beams. The heating may facilitate at least one of polymerization and crosslinking of at least one of the first radiation-sensitive material and the second radiation-sensitive material. Suitable temperatures and heating times may be selected as desired.

It is surprisingly found that the employment of the radiation-cured first and second flow field layers 202, 204 allows for the cost effective production of separator plates 8 for fuel cells for automotive and other applications, such as micro-fuel cells for portable devices. The separator plates 8 of the present disclosure employ highly ordered structures to provide a more uniform compression and increased durability in comparison to conventional metal foam parts. The present fabrication methodology is also less expensive than conventional methods for forming the separator plates 8, and allows customized separator plates 8 to be fabricated with significantly reduced lead times. In particular, production cost reductions may result from replacement of the conventional separator plates 8 in the fuel cell stack 2. It is also unexpectedly found that the employment of the separator plates 8 according to the instant disclosure may minimize a height of the fuel cell stack 2, thereby providing a desirably compact configuration.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for fabricating a separator plate for a fuel cell, the method comprising the steps of:
   providing a substrate;
   applying a first radiation-sensitive material to the substrate;
   placing a first mask between a first radiation source and the first radiation-sensitive material, the first mask having a plurality of substantially radiation-transparent apertures;
   exposing the first radiation-sensitive material to a plurality of first radiation beams defined by the substantially radiation-transparent apertures of the first mask to form a polymeric first flow field layer adjacent the substrate, the first flow field layer having a plurality of channel walls extending along a length of the first flow field layer that define a plurality of first reactant flow channels, the first flow field layer not having coolant flow channels;
   applying a second radiation-sensitive material to the substrate opposite the first radiation-sensitive material;
   placing a second mask between a second radiation source and the second radiation-sensitive material, the second mask having a plurality of substantially radiation-transparent apertures, the second mask different from the first mask; and
   exposing the second radiation-sensitive material to a plurality of second radiation beams defined by the substantially radiation-transparent apertures of the second mask to form a polymeric second flow field layer adjacent the substrate, the second flow field layer having a plurality of first channel walls and a plurality of second channel walls that form second reactant flow channels, at least a portion of the first channel walls and the second channel walls of the second flow field layer further cooperating with the substrate to form coolant flow channels that are not in communication with the second reactant flow channels of the second flow field layer.

2. The method of claim 1, further comprising the steps of coating at least one of the first flow field layer and the second flow field layer with an electrically conductive coating.

3. The method of claim 1, wherein the plurality of first and second radiation beams include at least one of a plurality of first radiation sheets extending along a first direction to form a the plurality of first - polymeric channel walls and a plurality of second radiation sheets extending along a second direction to form the plurality of second-polymeric channel walls.

4. The method of claim 1, further comprising the step of removing an uncured volume of at least one of the first and second radiation-sensitive materials following the step of exposing the first and second radiation-sensitive materials to the plurality of first and second radiation beams.

5. The method of claim 4, further comprising the step of rinsing at least one of the first and second radiation-sensitive flow field layers with a solvent to remove the uncured volume of at least one of the first and second radiation-sensitive materials.

6. The method of claim 1, further comprising the step of heating at least one of the first and second radiation-sensitive materials following the step of exposing the first and second radiation-sensitive materials to the plurality of first and second radiation beams, wherein the heating facilitates at least one of polymerizing and crosslinking of at least one of the first and second radiation-sensitive materials.

* * * * *